United States Patent [19]

Schley-May

[11] Patent Number: 4,926,464
[45] Date of Patent: May 15, 1990

[54] TELEPHONE COMMUNICATION APPARATUS AND METHOD HAVING AUTOMATIC SELECTION OF RECEIVING MODE

[75] Inventor: James T. Schley-May, Stow, Ohio
[73] Assignee: Telxon Corporation, Akron, Ohio
[21] Appl. No.: 318,730
[22] Filed: Mar. 3, 1989
[51] Int. Cl.⁵ .......................................... H04M 11/00
[52] U.S. Cl. ...................................... 379/99; 379/444
[58] Field of Search ....................... 379/52, 97, 98, 99, 379/443, 444

[56] References Cited

U.S. PATENT DOCUMENTS

| | | |
|---|---|---|
| 2,530,621 | 11/1950 | Lybarger ......................... 379/443 X |
| 3,396,245 | 8/1968 | Flygstad ......................... 379/443 X |
| 3,764,746 | 10/1973 | Libby ..................................... 379/98 |
| 3,875,335 | 4/1975 | Kennedy ............................... 379/444 |
| 4,490,585 | 12/1984 | Tanaka ................................... 379/52 |
| 4,524,244 | 6/1985 | Faggin et al. .......................... 379/93 |
| 4,697,283 | 9/1987 | La France et al. .................. 379/443 |

Primary Examiner—Keith E. George
Attorney, Agent, or Firm—Pretty, Schroeder, Brueggemann & Clark

[57] ABSTRACT

A telephone communication apparatus for receiving data from a telephone network in either of two modes, i.e., an acoustic mode and an electromagnetic mode, and for automatically selecting the particular mode that provides fewer data errors.

14 Claims, 2 Drawing Sheets

TELEPHONE COMMUNICATION APPARATUS AND METHOD HAVING AUTOMATIC SELECTION OF RECEIVING MODE

FIELD OF THE INVENTION

This invention relates generally to telephone communication apparatus and, more particularly, to such apparatus that automatically select between methods of receiving data from a telephone network.

BACKGROUND OF THE INVENTION

Communication terminals transfer data to and from other communication terminals along a communication channel, such as a telephone network. Often, the communication terminals are digital apparatus, such as digital computers or facsimile machines, which transfer data in digital form. Typically, a digital communication terminal connects to a telephone network by means of a telephone communication interface apparatus such as a modem, i.e., a modulator-demodulator. In transferring digital data, the goal is to transfer data quickly and accurately.

In general, transferring digital data requires that the digital communication terminal sending the digital data first organize the digital data according to a data format and then send the formatted data to a sending interface apparatus. The sending interface apparatus processes, or modulates, the formatted digital data into a signal that can be sent along the telephone network. The telephone network carries the modulated data signal to a receiving interface apparatus that demodulates it into the formatted digital data and sends the formatted digital data to the receiving digital communication terminal. Ideally, the receiving interface apparatus receives the digital data in minimum time and with minimum errors.

The format of digital data typically includes sequences, or blocks, of characters that represent information, i.e., data, in digital form. Each block of characters also includes overhead characters that tell the receiving communication terminal when a particular block it is receiving begins and ends. Certain other characters, which are useful in detecting errors in the block, such as wrong, missing or extra characters, that may be caused during the transfer of the block between communication terminals, are generally included as well. Error correction, however, is limited for the most part to detecting that a block contains an error without determining what particular characters are wrong, missing, or extra.

Errors in a character block received by the receiving interface apparatus typically are caused by some form of noise interfering with the receiver's reception of the modulated data signal. This occurs when the receiver is exposed to noise having a power level that is significant compared to the power level of the received modulated data signal. What constitutes a significant ratio of signal-to-noise depends on numerous factors. Generally, the lower the signal-to-noise ratio, the greater the rate of errors.

The length of a block of characters can range from one character to thousands of characters, and different blocks may vary in length. However, because of the large number of overhead characters normally associated with each block, each block is preferably as large as possible to increase throughput, i.e., the total number of data characters, not including overhead characters, received per unit of time. Since a block must be retransmitted if it contains a detected error, increasing the size of a block has the drawback of increasing the chance that for a given error rate a block will contain a detected error as well as the drawback of increasing the time required to retransmit a block. Consequently, a compromise block size is generally chosen, typically between 128 and 1024 characters for a telephone communication interface apparatus operating at a data transfer rate of 1200 baud.

One common type of telephone communication interface apparatus used to receive data is an acoustic interface apparatus, which is connected, or coupled, to the telephone network acoustically. A telephone speaker produces sound or acoustic signals that correspond to the modulated digital data carried by the telephone network, and an acoustic interface apparatus receives such sound signals by means of a microphone placed near the telephone speaker. The microphone is usually mounted inside a muffling cup which engages the earpiece of the telephone handset and which serves to reduce the level of ambient noise received by the microphone from its surroundings.

Since the microphone is usually omni-directional and the material from which the muffling cup is made does not tend to be a good absorber of sound or vibration, the microphone may receive ambient noise having significant power compared to the power of the received sound signal despite the use of a muffling cup. Consequently, the signal-to-noise ratio may be low enough to cause a significant number of errors in the blocks of characters received. Although the resulting error rate can require frequent retransmittals of character blocks, it generally is not high enough that reception of the digital data is prevented entirely.

Ambient noise typically interferes little with another type of telephone communication interface apparatus, known as an inductive interface apparatus, which does not use acoustic coupling. An inductive interface apparatus connects or couples the telephone network to the receiving communication terminal inductively. A telephone speaker produces an electromagnetic signal corresponding to the modulated data signal carried by the telephone network, and an inductive interface apparatus receives such electromagnetic signals by means of a suitable electromagnetic transducer, such as an inductive pickup coil, placed near the telephone speaker.

Similar to acoustic coupling, inductive coupling is subject to errors that result from the electromagnetic transducer receiving electromagnetic noise having a power level which is significant compared to that of the received electromagnetic signal. Electromagnetic noise sources include, for example, electric motors and switching power supplies. With inductive coupling, however, the primary concern is with electromagnetic signal power, not audible noise power. Although the speakers of all telephones produce electromagnetic signals, different types of telephones tend to produce electromagnetic signals having different powers. Some telephones produce electromagnetic signals having powers that are relatively low compared to typical electro-magnetic noise power. Consequently, the received signal-to-noise ratio is low enough that the error rate becomes significant. Other telephones produce electromagnetic signals having high power compared to typical noise power and, consequently, the error rate is insignificant. For example, public access phones are required by federal law to produce electromagnetic signals of sufficient power to be received by a hearing aid equipped with an appropriate electromagnetic transducer. Telephones for in-home or business use, on the other hand, are not required to meet this requirement.

Another type of telephone communication interface apparatus provides both acoustic and inductive modes. The choice of which mode to use is made manually at the start of the receipt of the digital data. However, this is a disadvantage because there is no determination of which mode can receive the data in the shorter time and with fewer errors.

There is, therefore, a need for an interface apparatus which receives data in either the acoustic mode or the inductive mode, but which avoids the disadvantages of manual selection. The present invention fulfills this need.

SUMMARY OF THE INVENTION

The invention provides a telephone communication apparatus which receives data from a telephone network in both an acoustic mode, i.e., as a sound signal, and an inductive mode, i.e., as an electromagnetic signal, and which automatically selects the signal to be directed to a receiving communication terminal based upon the number of errors detected in the data received in the respective modes. The invention comprises an interface apparatus which includes microphone means for receiving the sound signal and producing a corresponding microphone signal, electromagnetic transducer means for receiving the electromagnetic signal and producing a corresponding transducer signal, and mode selection means for detecting errors in the microphone and transducer signals and for selectively directing either the microphone signal or the transducer signal to a communication terminal based upon the number and type of errors detected.

More particularly, the mode selection means detects errors by performing data nonrecognition checking and block error checking, and it also detects when the telephone network is not sending data. The decision to switch modes is based on a comparison of accumulated errors for the two modes. A record is kept for data received in each mode of the number and nature of the errors, and the decision to switch modes occurs when the error record of the present mode exceeds the error record of the other mode by a predetermined threshold. The threshold is selected to be sufficiently high to prevent changing modes simply because a few errors occur in the present mode.

In a preferred embodiment of this invention, the interface apparatus sends the data it receives to a handheld communication terminal that includes a digital computer. In this manner, the interface apparatus can be made less expensive by having the computer in the handheld terminal implement the mode selection means in software. Moreover, housing the interface apparatus in the same structure as the handheld communication terminal reduces the overall size of the interface apparatus and the terminal, and provides the user the convenience of using a single device.

Other features and advantages of the present invention will become apparent from the following description of the preferred embodiment, taken in conjunction with the accompanying drawings, which disclose, by way of example, the principles of the invention.

BRIEF DESCRIPTION OF THE DRAWINGS

The invention will be readily understood by the following description of embodiments, by way of example, in conjunction with the accompanying drawings, in which.

DESCRIPTION OF THE PREFERRED EMBODIMENT

Figure 1:
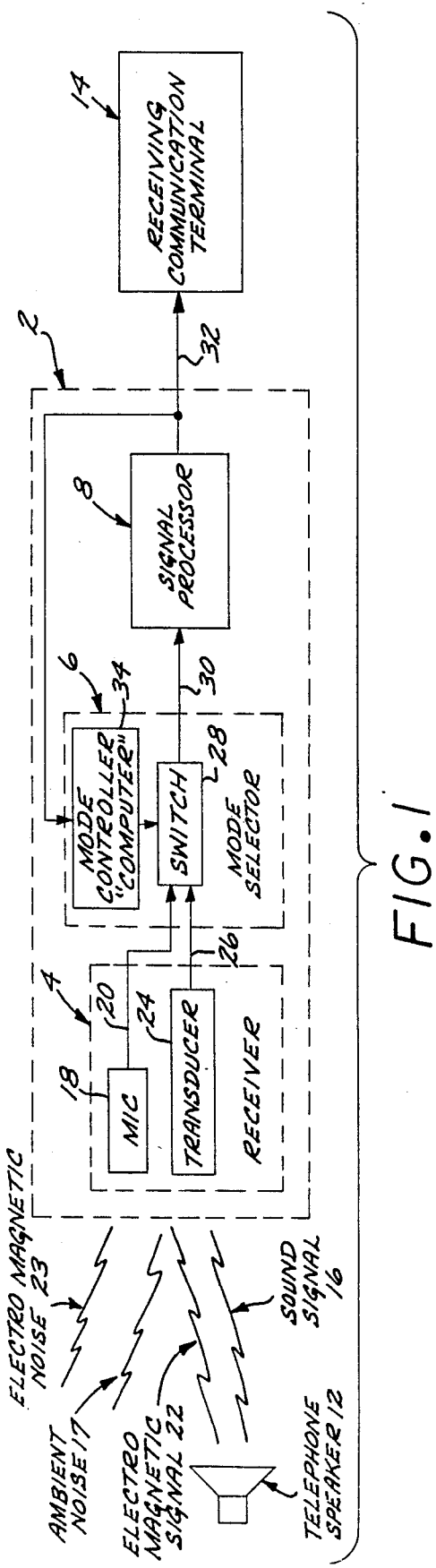
FIG. 1 is a block diagram of a telephone communication interface apparatus embodying the invention.

As shown in the exemplary drawings, and particularly in FIG. 1, there is shown a telephone communication interface apparatus 2 for directing digital data from a telephone network (not shown) to a receiving communication terminal 14. The interface apparatus comprises three stages, including a receiver 4, a mode selector 6, and a signal processor 8. The receiver receives a modulated data signal from a speaker 12 of a telephone unit (not shown) with superimposed noise in both an acoustic mode, i.e., as a sound signal corresponding to the modulated data signal, and in an inductive mode, i.e., as an electromagnetic signal corresponding to the modulated data signal. The modulated data signal has a format that includes character blocks with overhead characters and error-detection characters. The mode selector 6 detects errors in the received blocks, determines which mode (acoustic or electromagnetic) results in receiving blocks with fewer errors, and then automatically directs the proper signal to the signal processor 8. The signal processor demodulates the modulated data signal.

The receiver 4 receives signals in both the acoustic mode and the inductive mode. In particular, a microphone 18 receives a sound signal 16 produced by the telephone speaker 12, as well as ambient noise 17, and produces a corresponding microphone signal for output on line 20 to the mode selector 6. In addition, an inductive transducer 24 receives an electromagnetic signal 22 produced by the telephone speaker, as well as electromagnetic noise 23, and produces a corresponding transducer signal for output on line 26 to the mode selector 6. The mode selector selects the particular signal that is to be directed to the signal processor 8 for demodulating. The signal processor, in turn, produces a demodulated data signal for transmission on line 32 to the receiving communication terminal 14 and to the mode selector.

The mode selector 6 includes a selector switch 28 that receives the microphone signal and the transducer signal on lines 20 and 26, respectively, and selectively connects one of the two output signals to the signal processor 8 via line 30. The switch can comprise a single-pole, double throw CMOS analog electronic switch. This switch is controlled by a control signal which preferably consists of a single logic bit.

To control the switch 28, the mode selector 6 includes a mode controller 34 for detecting errors in the demodulated data signal and determining which mode is more likely to provide a faster data transfer, with fewer errors. In the preferred mode, as shown in FIG. 1, the mode controller does not detect errors in either the microphone signal on line 20 or the transducer signal on line 26, but rather detects errors in the demodulated data signal on line 32 which the signal processor has produced from either the microphone signal or transducer signal. This is done since error detection generally is simpler to perform after a signal has been demodulated. Further, demodulating and detecting errors in both the microphone signal and the transducer signal simultaneously adds on unnecessary cost to the apparatus.

The errors in the demodulated data signal may include missing, incorrect or extra characters, all of which require the transmitting communication terminal to resend the entire block of characters over the telephone network. In the acoustic mode, errors are typically caused by the microphone 18 receiving ambient noise 17 with significant power compared to the power of the received sound signal 16. As the signal-to-noise power ratio decreases, the error rate increases. Since ambient noise does not generally interfere with the electromagnetic signal 22, switching to the inductive mode when significant errors in the acoustic mode are being detected can often result in data transfer with fewer errors and in less time. Similarly, a high error rate in the inductive mode results when the power of the received electromagnetic signal 22 is relatively low compared to the power of the received electromagnetic noise 23, and switching to the acoustic mode at this time may result in a better data transfer.

In general, error detection may be implemented in hardware, software, or both, and it can range in sophistication from simple, e.g., parity checking, to complex, e.g., error correction coding. In a preferred embodiment, a software implementation is used which performs two types of error checking. One type of error checking is a data nonrecognition check which checks whether certain overhead characters are recognized. This condition may result from the telephone network simply failing to transmit a modulated data signal. The second type of error checking is a block error checking. This check indicates whether a block of characters contains one or more errors, but it does not isolate such errors to any particular characters in the block. A block with this condition is preferably transmitted again in its entirety until it has been received with no detected errors.

Figure 4:
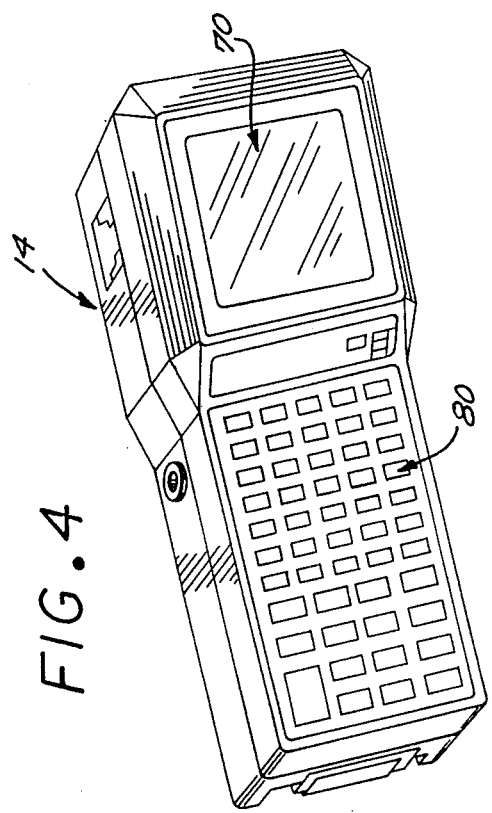
FIG. 4 is a front perspective view of the telephone communication interface apparatus of FIG. 3.
Figure 3:
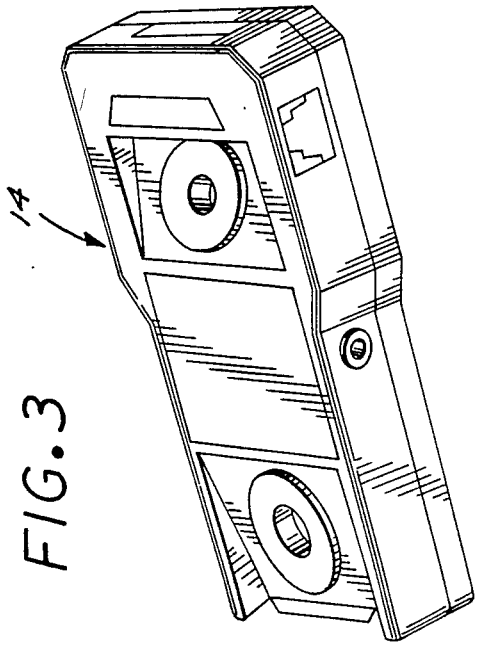
FIG. 3 is a rear perspective view of one embodiment of the telephone communication interface apparetus of FIG. 1, integrated with a handheld communication terminal.

The mode controller 34 of the mode selector 6 preferably selects the appropriate mode (i.e.. acoustic or inductive) based on a record of errors detected in the past in each mode, since past errors provide an indication of future error performance. The mode controller is preferably implemented using a digital computer that is part of the receiving communication terminal 14, and the interface apparatus 2 is preferably housed with the terminal in a handheld unit, as shown in FIGS. 3 and 4. This consolidation into a single unit saves cost and space.

The mode controller's functions, namely, error detection and determination of the appropriate mode, may be implemented by software in the receiving communication terminal 14. The software may be interactive which means that it communicates with the user by means of a display 70 and keyboard 80 (FIG. 4). A simplified flowchart for a computer program that implements the functions of the mode controller is described below, with reference to FIG. 2.

Figure 2:
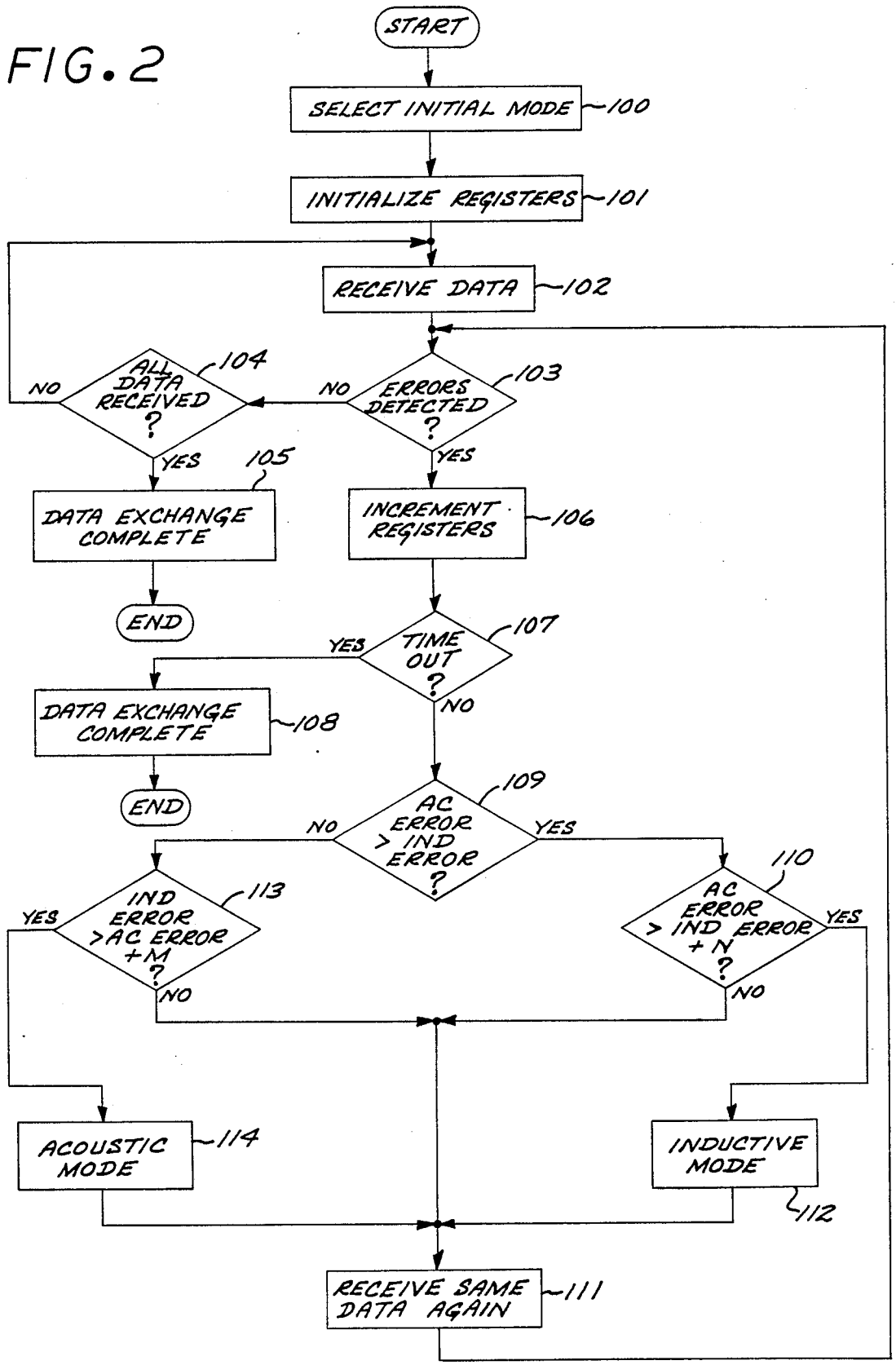
FIG. 2 is a simplified flowchart of a computer program that can be implemented by a controller in the telephone communication interface apparetus of FIG. 1.

Referring to FIG. 2, in the first step in the program, Step 100, the mode controller 34 selects the initial mode of the interface apparatus at the start of a data exchange. The user is preferably prompted via the display 70 (FIG. 4), and the user may select the initial mode by means of the keyboard 80 (FIG. 4). Alternatively, the initial mode may be selected by a default setting. The preferred default setting is the inductive mode, since the inductive mode is generally less susceptible to ambient noise than the acoustic mode. The mode controller selects the initial mode by sending an appropriate control signal to the switch 28.

Thereafter, in Step 101, various registers are reset to zero as will be discussed further below, with reference to Step 106. In Step 102, data is transferred from the telephone network to the receiving communication terminal 14. In particular, the modulated data signal is received by the signal receiver 4 and either the microphone signal on line 20 or the transducer signal on line 26 is connected by the mode selector 6 to the signal processor 8 for demodulation and transmission to the receiving communication terminal. One block of characters preferably is exchanged at a time as is the typical practice for error checking. During the course of the data exchange, the mode controller 34 monitors the demodulated data signal on line 32 to detect errors.

In Step 103, the mode controller 34 determines whether errors have been detected in the block just transferred. Two types of error checking are performed, i.e., data nonrecognition checking and block error checking. If neither of these checks detects an error, the program proceeds to Step 104, in which it is determined whether or not additional blocks remain to be received from the telephone network. If all of the blocks have been exchanged, there is, of course, no need to continue the data exchange, and the user is informed via the display 70 (FIG. 4) of the completion of the data transfer in Step 105. If, however, blocks remain to be transferred, the program returns to Step 102.

If errors are detected in Step 103, a determination of the proper response to the particular error checks is required. In Step 106, a record is made of the errors detected by the data nonrecognition check and the block error check. In a preferred embodiment, separate registers maintain records of the errors detected in each mode. At the start of data reception, the registers contain a zero value since no errors could have yet been detected. The registers preferably do not simply count the number of errors of any type that have been detected in the microphone signal and the transducer signal; rather, a predetermined weight is assigned to each type of error check for each signal. For each error detected, the appropriate weight is added to the corresponding mode error register, i.e., the inductive error register or the microphone error register. In this manner, the error registers do not simply record the number of errors, but record the overall impact of the number and nature of the errors.

Step 106 also includes a timeout register that counts the number of nonrecognition errors that have occurred in either mode. The purpose of the timeout register is to detect when the telephone network is no longer sending a modulated data signal to the interface apparatus, a condition indicated by a high rate of data nonrecognition errors.

Thereafter, in Step 107, it is determined whether or not the telephone network is sending data by comparing the value in the timeout register with a predetermined value. When the timeout register equals or exceeds that predetermined value, it is assumed that no data is being sent and the mode controller 34 halts the attempt to receive blocks. The user is then prompted via the display 70 (FIG. 4) in Step 108 that the data exchange has been unsuccessful. The predetermined value preferably is set sufficiently high to allow attempts to receive blocks by both modes before halting data reception.

If it is determined in Step 107 that the telephone network is sending data, the next decision in the program is whether or not modes should be switched in response to the detected errors. Preferably, the mode is not switched merely because the selected mode has a slightly greater value in its error register than for the other mode, since this would result in switching modes each time an error was detected. For example, if an error is detected in the first block of data received, and the mode is the inductive mode, the mode would be switched to the acoustic mode because the inductive error register would no longer contain a zero value, and thus would contain a value greater than the zero value in the acoustic error register.

Similarly, if modes are switched based only on a small difference in values in the inductive and acoustic error registers, mode switching could be caused by the few errors which results from errors that are caused by minor transient noise sources. To avoid this, mode switching should take place only if the value in the error register of the present mode exceeds that of the other mode by some value representing multiple errors. As an example, this value may be five times the weight assigned to an error detected by the block error check. This value may be different for switching from the inductive mode to acoustic mode than for switching from the acoustic to the inductive, since both modes are subject to different kinds of transient errors.

The mode switching decision begins with Step 109, in which it is determined which error register, the inductive error register or the acoustic error register, contains the smaller value. If the inductive error register value is smaller or equal, the program proceeds to Step 110 in which it is determined whether or not the difference between the values exceeds a first predetermined threshold. If this predetermined threshold has not been exceeded, the program proceeds to Step 111 without first switching modes. If, however, the threshold has been exceeded, the inductive mode is selected in Step 112, and the program then proceeds to Step 111.

If, on the other hand, it is determined in Step 109 that the value in the acoustic error register is less than that in the inductive error register, the program proceeds to Step 113 in which it is determined whether or not the difference between the values exceeds a second predetermined threshold. If this predetermined threshold has not been exceeded, the program proceeds to Step 111 without first switching modes. Otherwise, in Step 114 the acoustic mode is selected, and the program proceeds to Step 111.

In Step 111, the previous transfer of data is repeated, during which error detection is again performed. The algorithm then loops back to Step 102, and repeats the cycle of error detection and mode decision until all of the blocks of data have been received without error.

Thus, the mode controller 34 can be adapted to perform the various functions described above and to include the various elements necessary as means for performing the functions. The details of such elements and their interaction should be readily apparent to those skilled in the art.

The exemplary program outlined in FIG. 2 is merely one suitable approach to implementing software error detection and mode determination for the mode controller 34. Other approaches should be readily apparent to those skilled in the art.

From the foregoing description, it will be appreciated that the invention provides an improved telephone communication interface apparatus that automatically selects the particular mode (i.e., acoustic or inductive) which transfers data to a receiving communication terminal with fewer errors and in reduced time.

Although a particular form of the invention has been illustrated and described, it will be apparent that various modifications can be made without departing from the spirit and scope of the invention. Accordingly, the invention is to be defined only by the appended claims.

What is claimed is:

1. Telephone communication interface apparatus for receiving data from a telephone network and directing the received data to a communication terminal, the telephone network including a telephone speaker that emits both a sound signal and an electromagnetic signal, both signals corresponding to the data carried by the telephone network, the apparatus comprising:
   microphone means for receiving the sound signal and producing a corresponding microphone signal;
   electromagnetic transducer means for receiving the electromagnetic signal and producing a corresponding transducer signal; and
   mode selection means for detecting data errors in the microphone signal and the transducer signal and selectively directing either the microphone signal or the transducer signal to the communication terminal in accordance with the detected data errors.

2. The telephone communication interface apparatus of claim 1, wherein the mode selection means includes a means for selectively directing the transducer signal to the communication terminal when the apparatus first receives data from the telephone network.

3. A telephone communication interface apparatus for receiving data from a telephone network and directing the received data to a communication terminal, the telephone network including a telephone speaker that emits both a sound signal and an electromagnetic signal, both signals corresponding to the data carried by the telephone network, the apparatus comprising:
   microphone means for receiving the sound signal and producing a corresponding microphone signal;
   electromagnetic transducer means for receiving the electromagnetic signal and producing a corresponding transducer signal; and
   mode selection means for detecting data errors in the microphone signal and the transducer signal and selectively directing either the microphone signal or the transducer signal to the communication terminal in accordance with the detected data errors, wherein the mode selection means includes
   error recording means for counting errors detected in the microphone signal and for counting errors detected in the transducer signal,
   means for comparing the error count for the signal currently being directed to the communication terminal with a predetermined threshold, and means for directing the other signal to the communication terminal when the error count for the signal currently being directed exceeds the predetermined threshold.

4. The telephone communication interface apparatus of claim 3, wherein:
the error recording means includes
acoustic error register means for recording the count of errors detected in the microphone signal while the microphone signal is being directed to the communication terminal, and
inductive error register means for recording the count of errors detected in the transducer signal while the transducer signal is being directed to the communication terminal; and
the mode selection means includes threshold determination means for determining the predetermined threshold based on the number of errors recorded by the acoustic error register means when the transducer signal is being directed to the communication terminal and based on the number of errors recorded by the inductive error register means when the microphone signal is being directed to the communication terminal.

5. The telephone communication interface apparatus of claim 4, wherein the threshold determination means determines the predetermined threshold by adding a predetermined value to the number of errors recorded by the error register means for the signal not currently directed by the mode selection means to the communication terminal.

6. The telephone communication interface apparatus of claim 4, wherein the threshold determination means determines the predetermined threshold by adding a first predetermined value to the number of errors recorded by the acoustic error register means when the transducer signal is being directed to the communication terminal, and by adding a second predetermined value to the number of errors recorded by the inductive error register means when the microphone signal is being directed to the communication terminal.

7. The telephone communication interface apparatus of claim 3, wherein:
the error recording means includes
means for detecting data nonrecognition errors and block errors,
acoustic error register means for accumulating a first predetermined weight for each detected data nonrecognition error and a second predetermined weight for each error detected block error while the microphone signal is being directed to the communication terminal, and
inductive error register means for accumulating a third predetermined weight for each detected data nonrecognition error and a fourth predetermined weight for each detected block error while the transducer signal is being directed to the communication terminal; and
the mode selection means includes threshold determination means for determining the predetermined threshold based on the count stored in the acoustic error register means when the transducer signal is being directed to the communication terminal and based on the count stored in the inductive error register means when the microphone signal is being directed to the communication terminal.

8. A telephone communication apparatus for receiving data from a telephone network and directing the received data to a communication terminal, the telephone network including a telephone speaker that emits both a sound signal and an electromagnetic signal, both signals corresponding to the data carried by the telephone network, the apparatus comprising:
microphone means for receiving the sound signal and producing a corresponding microphone signal;
electromagnetic transducer means for receiving the electromagnetic signal and producing a corresponding transducer signal; and
mode selection means for detecting data errors in the microphone signal and the transducer signal and selectively directing either the microphone signal or the transducer signal to the communication terminal in accordance with the detected data errors, wherein the mode selection means includes
means for detecting data nonrecognition errors in the signal being directed to the communication terminal,
timeout register means for counting errors detected by data nonrecognition checks, and
means for comparing the number counted by the timeout register means to a predetermined timeout threshold and for disabling the apparatus when the threshold is exceeded.

9. Telephone communication interface apparatus for receiving data from a telephone network and directing the received data to a communication terminal, the telephone network including a telephone speaker that emits both a sound signal and an electromagnetic signal, both signals corresponding to the data carried by the telephone network, the apparatus comprising:
microphone means for receiving the sound signal and producing a corresponding microphone signal;
electromagnetic transducer means for receiving the electromagnetic signal and producing a corresponding transducer signal;
signal processing means for demodulating a selected one of the microphone signal and the transducer signal and sending the demodulated signal to the communication terminal;
switching means for selectively directing to the signal processing means either the microphone signal or the transducer signal in response to a binary control signal; and
mode control means for detecting data errors in the demodulated signal and generating the binary control signal in accordance with the detected data errors.

10. A telephone communication interface apparatus for receiving data from a telephone network and directing the received data to a communication terminal, the telephone network including a telephone speaker that emits both a sound signal and an electromagnetic signal, both signals corresponding to the data carried by the telephone network, the apparatus comprising:
microphone means for receiving the sound signal and producing a corresponding microphone signal;
electromagnetic transducer means for receiving the electromagnetic signal and producing a corresponding transducer signal;
signal processing means for demodulating a selected one of the microphone signal and the transducer signal and sending the demodulated signal to the communication terminal;
switching means for selectively directing to the signal processing means either the microphone signal or the transducer signal in response to a binary control signal; and mode control means for detecting data errors in the demodulated signal and generating the binary control signal in accordance with the detected data errors, wherein the mode control means includes acoustic error register means for recording a value representing errors detected in the demodulated signal while the microphone signal is being directed to the signal processing means, inductive error register means for recording a value representing errors detected in the demodulated signal while the transducer signal is being directed to the signal processing means, threshold determination means for determining a first predetermined threshold based on the value recorded in the acoustic error register means and a second predetermined threshold based on the recorded value in the inductive error register means, first comparison means for comparing the recorded value in the acoustic error register with the second predetermined threshold when the microphone signal is being selectively directed by the switching means to the signal processing means and for changing the state of the binary control signal when the threshold is exceeded, and second comparison means for comparing the recorded value in the inductive error register with the first predetermined threshold when the transducer signal is being selectively directed by the switching means to the signal processing means and for changing the state of the binary control signal when the threshold is exceeded.

11. The telephone communication apparatus of claim 10, wherein:

the mode control means includes means for detecting data nonrecognition errors and block errors in the signal being directed to the communication terminal;

the acoustic error register means includes means for accumulating a first predetermined weight for each detected data nonrecognition error and a second predetermined weight for each detected block error while the microphone signal is being directed to the signal processing means; and the inductive error register means includes means for accumulating a third predetermined weight for each detected data nonrecognition and a fourth predetermined weight for each detected block error while the transducer signal is being directed to the signal processing means.

12. A method of receiving data from a telephone network and directing the received data to a communication terminal, the telephone network including a telephone speaker that emits both a sound signal and an electromagnetic signal, both signals corresponding to the data carried by the telephone network, comprising the steps of:

receiving the sound signal and producing a corresponding microphone signal;

receiving the electromagnetic signal and producing a corresponding transducer signal; and detecting data errors in the microphone signal and the transducer signal and selectively directing either the microphone signal or the transducer signal to the communication terminal in accordance with the detected data errors.

13. The method of claim 12 which further includes a step of selectively directing the transducer signal to the communication terminal when data is first received from the telephone network.

14. A method of receiving data from a telephone network and directing the received data to a communication terminal, the telephone network including a telephone speaker that emits both a sound signal and an electromagnetic signal, both signals corresponding to the data carried by the telephone network, comprising the steps of:

receiving the sound signal and producing a corresponding microphone signal;

receiving the electromagnetic signal and producing a corresponding transducer signal; and detecting data errors in the microphone signal and the transducer signal and selectively directing either the microphone signal or the transducer signal to the communication terminal in accordance with the detected data errors, wherein the step of detecting includes the steps of accumulating an acoustic error value representing errors detected in the microphone signal while the microphone signal is being directed to the communication terminal, accumulating an inductive error value representing errors detected in the transducer signal while the transducer signal is being directed to the communication terminal, comparing the error value accumulated for the signal presently being directed to the communication terminal with the error value accumulated for the other signal, and determining which signal to direct to the communication terminal based on the comparison of error values.

* * * * *